United States Patent [19]

Jacobs et al.

[11] Patent Number: 4,466,791
[45] Date of Patent: Aug. 21, 1984

[54] SINGLE VAPOR CONDENSATION SOLDERING FACILITY

[75] Inventors: Brian E. Jacobs, Collingswood Township, Camden County, N.J.; Edward J. March, Lower Makefield Township, Bucks County, Pa.

[73] Assignee: AT&T Technologies, Inc., New York, N.Y.

[21] Appl. No.: 437,058

[22] Filed: Oct. 27, 1982

[51] Int. Cl.³ .................... F27B 9/04; F27B 15/00; F26B 3/00; F26B 11/18
[52] U.S. Cl. .................................. 432/23; 34/34; 34/189; 414/221; 432/197
[58] Field of Search ............. 432/23, 197; 228/180 R; 34/34, 189; 414/217, 221

[56] References Cited

U.S. PATENT DOCUMENTS

| | | | |
|---|---|---|---|
| Re. 30,399 | 9/1980 | Ammann et al. | 228/180 R |
| 2,834,665 | 5/1958 | Rudolph et al. | 414/221 |
| 3,125,232 | 3/1964 | Brinkman et al. | 414/217 |
| 3,197,328 | 7/1965 | Jung et al. | 432/197 |
| 3,904,102 | 9/1975 | Chu et al. | 34/27 X |
| 4,077,467 | 3/1978 | Spigarelli | 34/27 X |
| 4,264,299 | 4/1981 | Ammann et al. | 432/13 |

Primary Examiner—John J. Camby
Attorney, Agent, or Firm—D. J. Kirk

[57] ABSTRACT

A condensation soldering facility (10) comprised of a housing (12) having a divider member (22) therein which separates the housing into a drying chamber (24) in an upper section and a soldering chamber (26) in a lower section. A transfer member (76) is pivotably mounted within the drying chamber (24) to receive articles (112—112) to be soldered through an access door (71) in the top of the drying chamber (24) and arcuately transfer the articles through an access door (44) in the divider member (22) to solder the articles in the soldering chamber (26).

8 Claims, 5 Drawing Figures

SINGLE VAPOR CONDENSATION SOLDERING FACILITY

TECHNICAL FIELD

The instant invention relates to a condensation heating system. In particular, the invention is directed to a single vapor condensation heating system and techniques for transferring articles therein.

BACKGROUND OF THE INVENTION

In the early 1970's the first commercial system for condensing hot saturated vapor on articles for the purposes of soldering, brazing, fusing, etc., articles was developed. That system is described in detail in U.S. Pat. No. Re. 30,399 which issued on Sept. 9, 1980 to R. C. Pfahl and H. H. Ammann assigned to Western Electric Company, Inc. and Bell Telephone Laboratories, Inc., and is hereby incorporated by reference herein. That patent discloses an article to be soldered, fused or brazed being placed in a vessel containing a body of hot saturated vapor. The vapor is generated by continuously boiling a heat transfer liquid having selected properties including a boiling point at least equal to and preferably above the temperature of the soldering, fusing or brazing operation to be performed. The vapor condenses on the article and gives up its latent heat of vaporization thereto to heat the article to the temperature required for the particular operation. This technique has found wide acceptance in the industry and has substantially advanced the art of soldering, brazing and fusing.

The Pfahl et al. process was improved to substantially reduce losses of the hot saturated vapor of the relatively expensive heat transfer (primary) liquid by a technique disclosed in U.S. Pat. No. 3,904,102 to T. Y. Chu et al., which issued Sept. 9, 1975 and is assigned to the instant assignee. In Chu et al. a blanket of secondary vapor, from a relatively inexpensive liquid, having a density intermediate that of the relatively expensive primary heat transfer vapor and the atmosphere, floats on the body of primary vapor in order to reduce the losses thereof from a condensation heating vessel.

The article on which the soldering, fusing or brazing operation is to be performed is passed through the body of secondary vapor into the body of primary vapor in the vessel. The primary vapor condenses on the article and the latent heat of vaporization of the condensing primary vapor heats the article to the temperature required for the soldering, fusing or brazing operation. After completion of the operation, the article is withdrawn from the body of primary vapor, through the blanketing body of secondary vapor, out of the vessel and into the atmosphere where it is cooled to ambient temperature. As the article moves out of the vessel, vapor is also dragged out and lost to the atmosphere. Most of the vapor is secondary, however, some is the relatively expensive primary vapor.

One technique designed to lessen such vapor losses is described in U.S. Pat. No. 4,264,299 which issued on Apr. 28, 1981 to H. H. Ammann et al., which is incorporated herein by reference. That patent discloses a condensation heating facility having a primary vapor chamber with a drying chamber located thereabove. The drying chamber has first and second doors in the top and bottom portions thereof, respectively. Articles to be soldered are conveyed into the drying chamber through the first door and then into the primary vapor chamber, through the second door, where the soldering, fusing or brazing operation takes place. The articles are then removed to the drying chamber, the first and second doors are closed, and drying apparatus activated to remove and filter out any primary vapor therein. The first door is then opened and the dry, soldered articles removed from the facility.

The Ammann et al. patent has been found effective for soldering articles in a closed, single vapor condensation heating facility which substantially reduces loss of the expensive primary vapor to the atmosphere. However, the various conveying mechanisms required to transport articles through the facility are complex. Therefore, the drying chamber cannot be completely sealed during the drying operation. Additionally, the conveying mechanisms passing through the facility substantially increase the size of the machine because of the horizontal and vertical movement of parts required.

Accordingly, there is a need for a simple and effective technique for loading and removing articles from a single vapor condensation heating facility while providing substantially complete sealing of the drying chamber during the drying operation.

SUMMARY OF THE INVENTION

The instant invention is directed to a method for transferring an article into and through a heating facility having a condensation heating chamber in the lower portion thereof and a drying chamber in the upper portion thereof. The method comprises the steps of: projecting a first portion of a transfer member, located within the drying chamber, through an upper access means in the heating facility; attaching the article to said first portion; and moving the first portion to transfer the article thereon through the drying chamber and into the condensation heating chamber through a lower access means in the bottom of said drying chamber.

DETAILED DESCRIPTION

In a preferred embodiment the instant invention is described as it relates to soldering articles by condensing hot saturated vapor thereon to reflow previously deposited solder to form a bond. However, such disclosure is for purposes of exposition and not for limitation for the instant technique may be used in various heating operations such as fusing, brazing, curing, etc.

Figure 1:
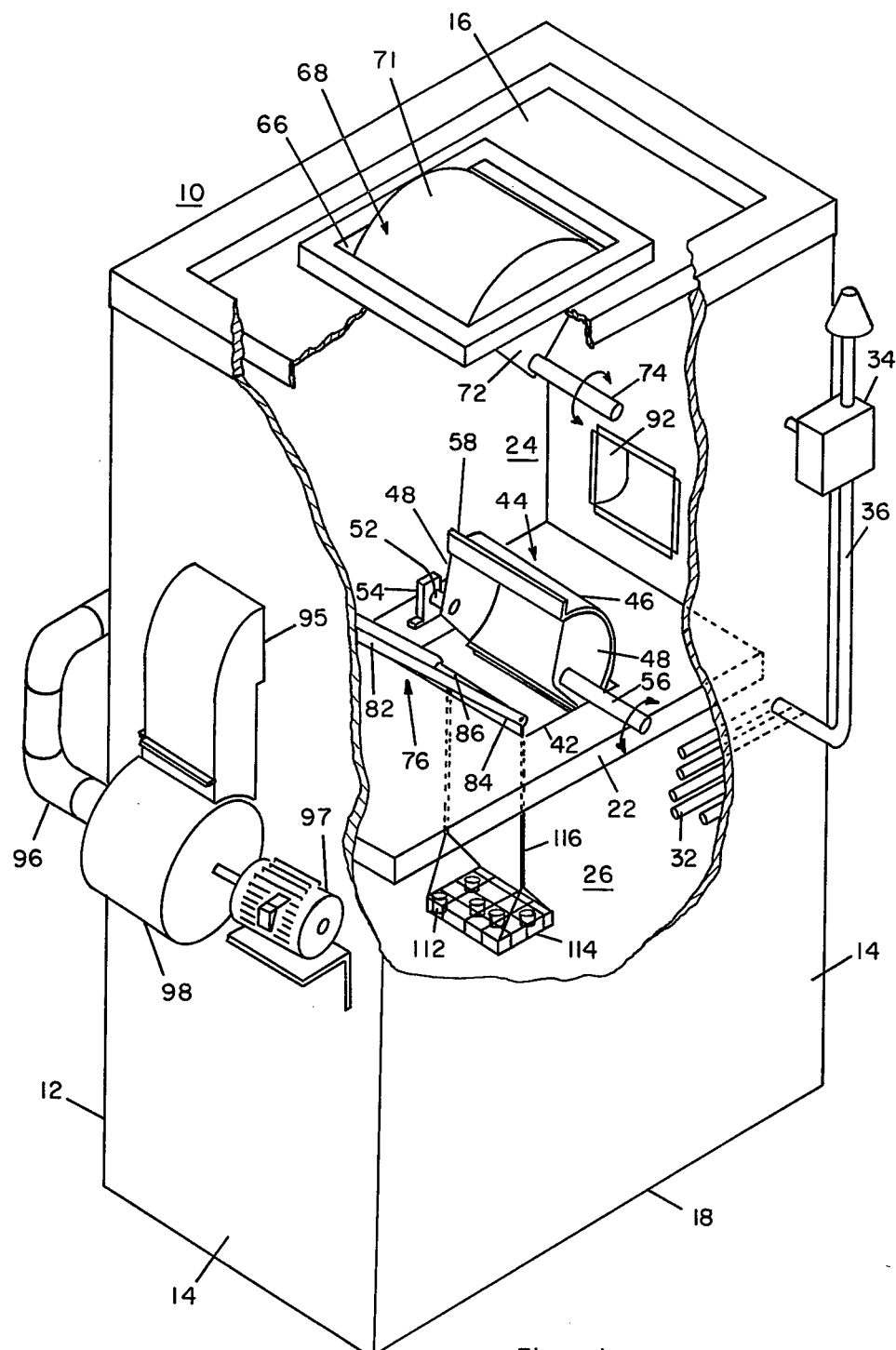
FIG. 1 is an isometric view of a single vapor condensation heating facility which incorporates the features of the instant invention.

FIG. 1 is an isometric view of the instant closed, single vapor condensation soldering facility generally designated by the numeral 10. The facility 10 is comprised of a housing 12 having sidewalls 14—14, a top section 16 and a floor 18. A planar dividing member 22 divides the housing into a drying chamber 24 and a condensation soldering chamber 26.

The condensation soldering chamber 26 has a plurality of immersion heating coils 28—28 in the lower portion thereof (see FIG. 2) and a set of condensing coils 32—32 mounted proximate the planar dividing member 22. A pressure relief apparatus 34 communicates with the soldering chamber 26 via a conduit 36.

Figure 3:
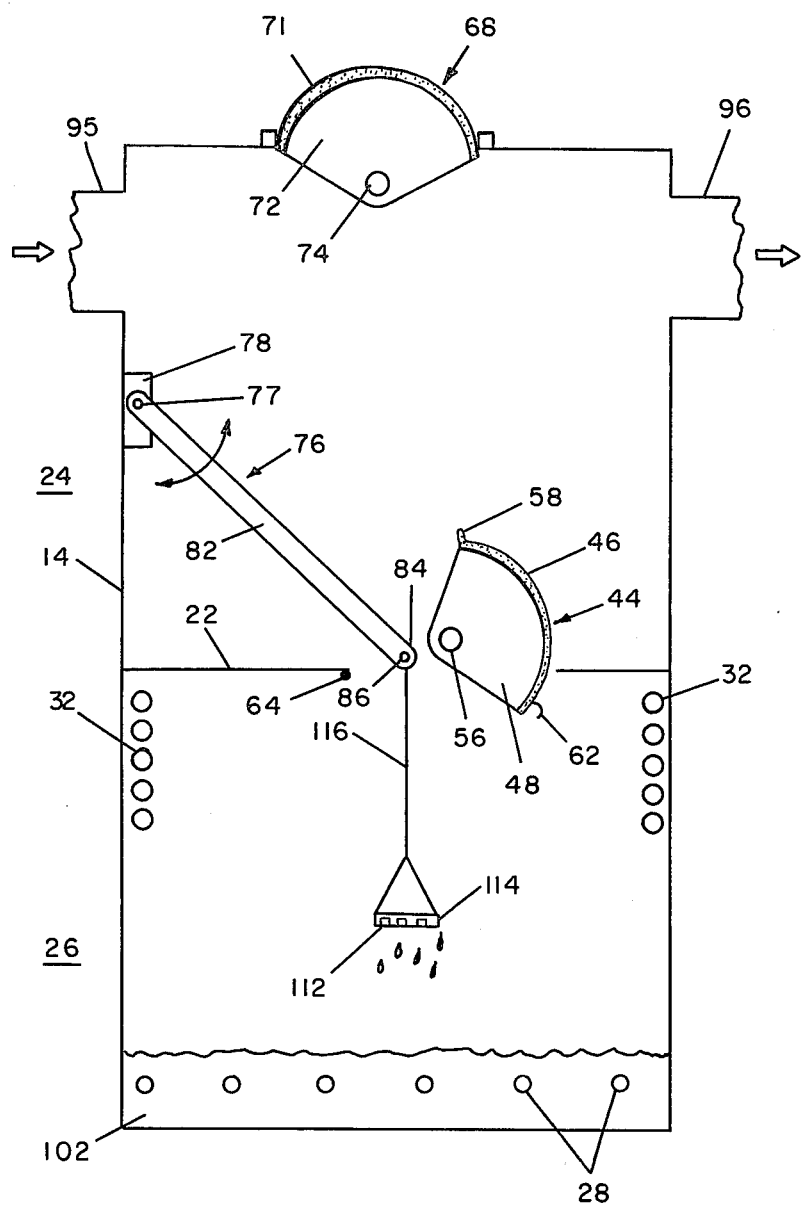

The dividing member 22 has a substantially rectangular opening 42 with a first access door 44 rotatably mounted therein. The access door 44 has an arcuate surface 46 with opposed end segments 48—48. A first shaft 52 extends normally from one segment 48 to a support bearing 54, while a second shaft 56, axially aligned with the first shaft extends from the other segment 48 through the wall 14 to a shaft rotating mechanism (not shown). One longitudinal edge of the arcuate surface 46 terminates in a planar ledge 58 while the other longitudinal edge terminates in substantially "U" shaped trough 62 (see FIG. 3). An elongated seal 64 having a circular cross section is fixedly mounted on the underside of the dividing member 22 proximate the opening 42 as shown in FIG. 3.

The top section 16 of the drying chamber 24 also has an opening 66 with a second access door 68 therein having an arcuate surface 71 opposed end segments 72—72 (only one shown) with a third shaft 74 extending normally from one end segment 72 and through the wall 14 to a shaft rotating mechanism (not shown). A fourth shaft (not shown), axially aligned with the third shaft 74, extends normally from the other end segment and terminates in a support bearing (not shown).

A transfer means 76 is pivotably mounted on a shaft 77 which extends through the wall 14 for rotation by a mechanism (not shown). The shaft 77 is rotatably mounted within a support member 78 which is fixedly attached to the inner surface of a wall 14. The means 76 is comprised of a pair of parallel arms 82—82 connected at their free ends 84—84 by a cross member 86.

Figure 4:
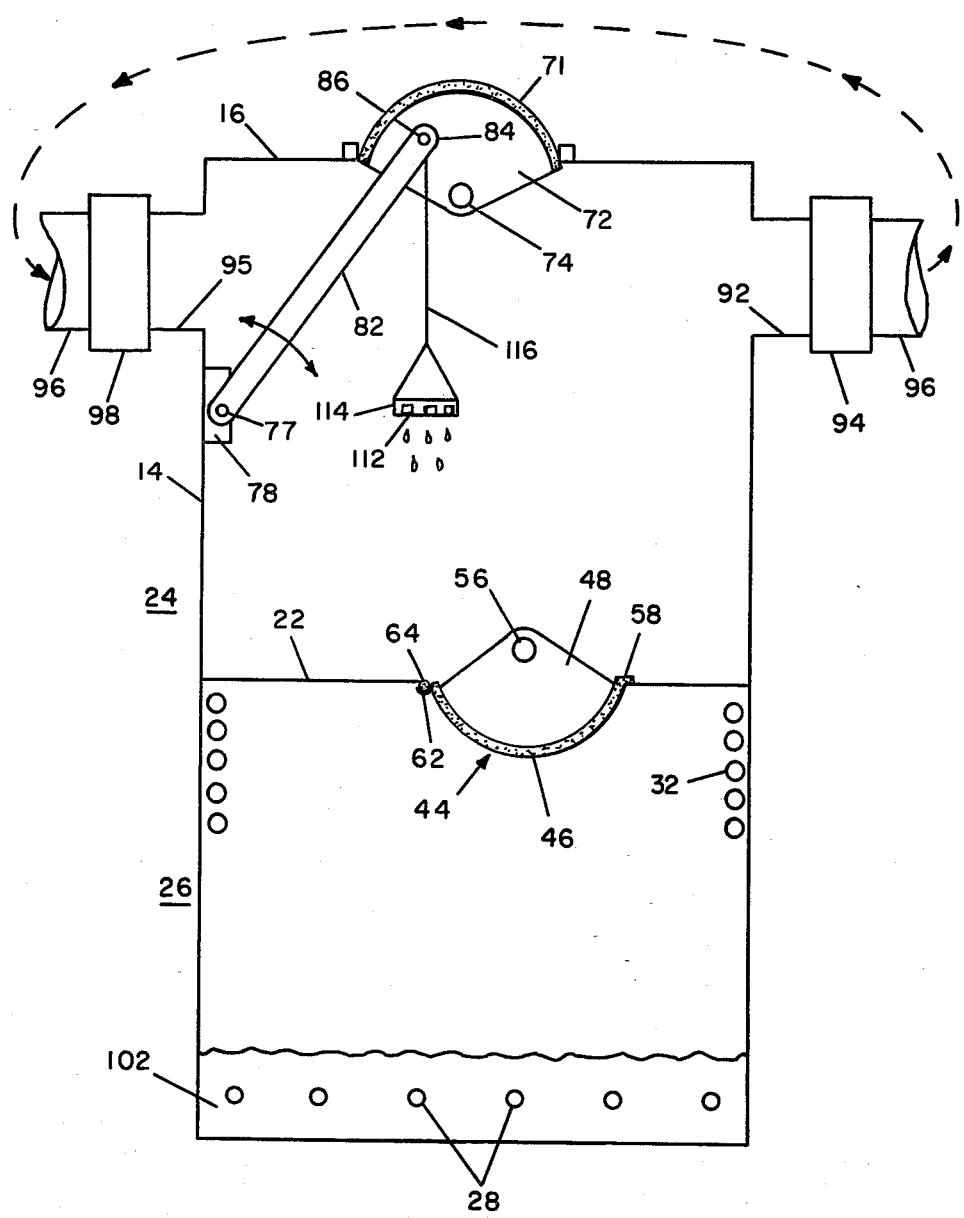

As schematically shown in FIG. 4, the drying chamber 24 also has a drying air outlet 92 which communicates with a vapor recovery system 94, and connects back into the drying chamber through an opening 95 via a vapor recovery loop 96. A motor 97 mounted on one of the sides 14 of the facility 10 controls a blower 98 in the loop 96.

In operation (see FIG. 2), a heat transfer liquid 102, such as Fluorinert FC-70 sold by the 3M Company, is raised to its boiling temperature (e.g., approximately 419° F.) upon activation of the immersion heating coils 28—28. The vapor of the heat transfer liquid 102 is substantially confined in the soldering chamber 26 by the cooling coils 32—32 which are maintained at about 100° F.

Figure 2:
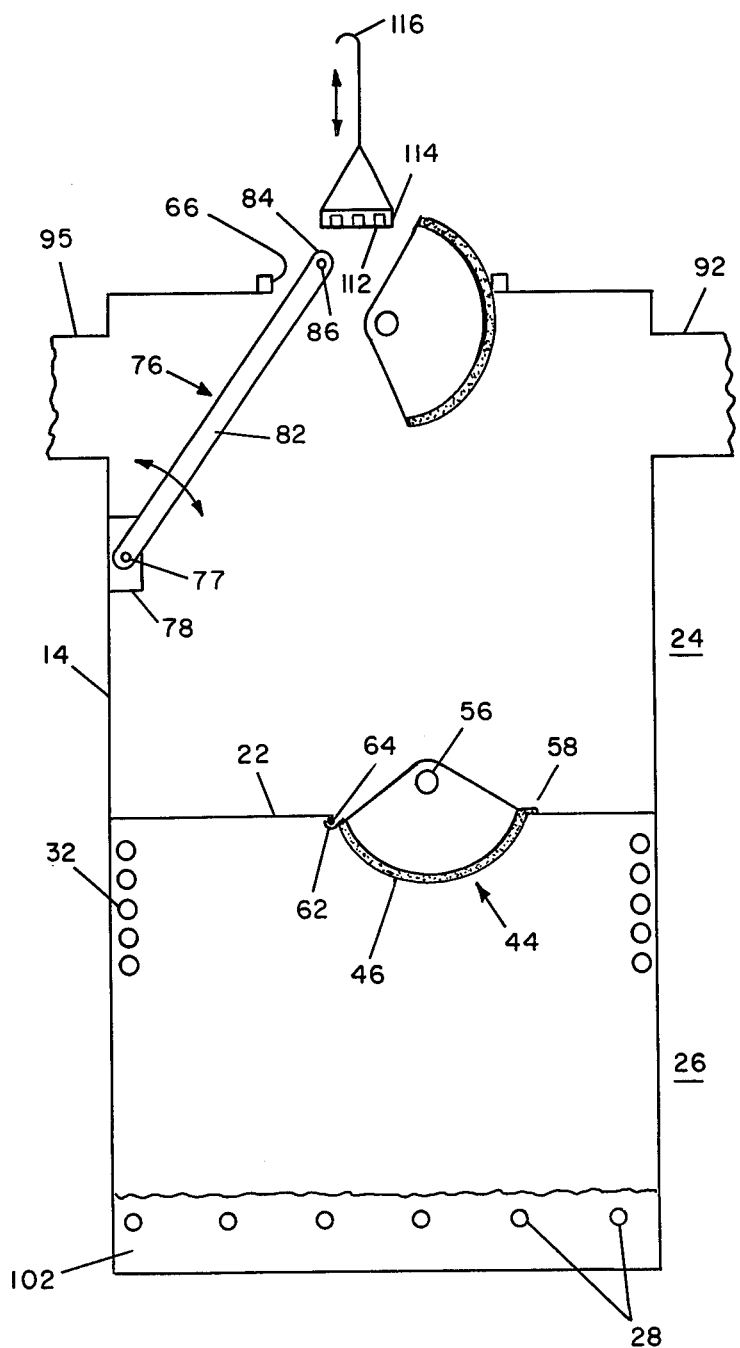
FIGS. 2 to 4 are schematic drawings which depict the various steps associated with the operation of the instant facility.

Articles 112—112 to be soldered are placed in a basket 114 having a pair of hangers 116—116 extending from the upper portion thereof, as shown in FIGS. 1 and 2. The first access door 44 is then rotated to the closed position while the second access door 68 is rotated to the open position as shown in FIG. 2 and the transfer means 76 is rotated counterclockwise until the cross-member 86 projects through the opening 66. The basket 114 with the articles 112—112 therein is lowered into the drying chamber 24 and the hangers 116—116 positioned on the cross member 86 of the transfer means 76. The second access door 68 is then closed and the first access door 44 opened and the transfer means 76 rotated clockwise to lower the basket 114 into the primary vapor in the soldering chamber 26 as shown in FIG. 3. Following the soldering operation in the chamber 26, the transfer means 76 is rotated counterclockwise to remove the basket 114 with the articles 112—112 therein from the chamber 26 and hold them within the drying chamber 24 as shown in FIG. 4. The second access door 44 is rotated to its closed position to seal the drying chamber 24. At this time the drying chamber 24 is substantially fully sealed having no conveying or other apparatus passing through the chamber walls 14.

At this time the vapor recovery system 94 is activated (see FIG. 4) to remove dragout vapor from the soldered articles 112—112 and vapor which may have escaped from the soldering chamber 26 into the drying chamber 24. The vapor recovery system 94 is the same as described in the aforementioned U.S. Pat. No. 4,264,299. In particular, FIG. 2 of that patent shows a recovery system comprised of a condenser, heaters and filters. The air and vapor mixture drawn from the drying chamber 24 passes through the condenser which chills the mixture to a temperature sufficient to cause condensation of a substantial portion of the vapor. Once the vapor is extracted from the mixture the condensate is collected and routed to a filtration system for further cleaning and routed back into the soldering chamber 26. Following condensation the resulting atmospheric mixture is passed through a heater to raise the temperature of the mixture prior to return to the drying chamber 12 thereby increasing the capacity of the atmosphere to absorb any primary vapor remaining in the drying chamber. The blower 98 recirculates the atmosphere in the drying chamber 24 for a time sufficient to remove substantially all the heat transfer vapor therein. Such time will vary in accordance with the number and size of the articles 112—112 soldered and the volume of the drying chamber 24.

Following the drying operation, the second access door 68 is opened (see FIG. 2) and the transfer means 76 rotated counterclockwise to project the end 84 through the opening 66 where an operator, or automatic transfer equipment (not shown) removes the basket 114 of soldered articles 112—112 and places a fresh basket of articles to be soldered on the transfer means.

Advantageously, the use of the rotatable access doors 44 and 68 and the pivotable transfer means 76 located fully within the condensation soldering facility 10 permit a slightly arcuate, vertical, movement of the articles 112—112 therein which minimizes the size of the facility. Additionally, the rotating access doors 44 and 68 minimize the size of the facility 10 and permit a compact enclosure. The arcuate access doors 44 and 68 also result in less displacement of air within the facility than planar swinging doors. Additionally, such doors 44 and 68 cause less disturbance of the primary vapor in the soldering chamber 26.

Most importantly the transfer means 76 does not require the feed through openings in the facility 10 for continuous conveying mechanisms that transfer the articles 112—112 to be soldered into the soldering chamber 26 as are required in the prior art facilities. With such effective sealing of the instant drying chamber 12 the fluid loss due to escaping vapor is substantially minimized.

Figure 5:
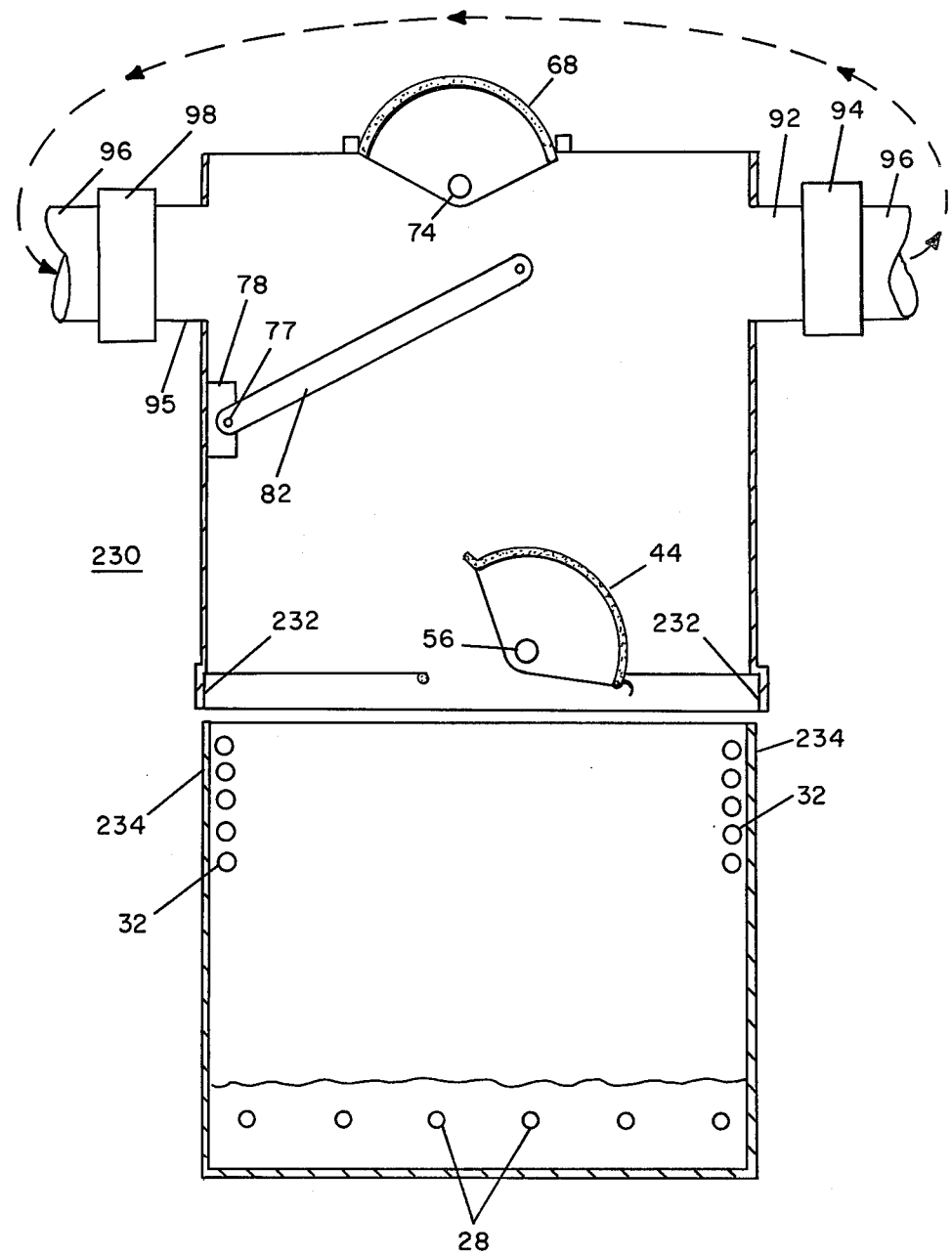
FIG. 5 depicts an apparatus for modifying condensation soldering facilities with a vapor recovery system.

A further embodiment of the instant invention is shown in FIG. 5 wherein an existing condensation heating facility 226, which may be a single vapor system shown in the aforementioned U.S. Pat. No. Re. 30,399 or a two vapor system shown in U.S. Pat. No. 3,904,102, is modified by mounting a drying apparatus 230 thereon. In the case of the two vapor system the apparatus 230 can replace the secondary vapor blanket chamber. The apparatus 230, and the operation thereof, is substantially the same as incorporated in the integrated facility 10 shown in FIG. 1 and the same numbers are used to identify like elements. The lower portion of the apparatus 230 has a circumferential lip 232 which mates with the upper edge 234 of the condensation heating facility 226. The lip 232 may then be welded, bonded or otherwise sealed to upper edge 234 of the facility 226.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method for transferring an article into and through a heating facility having a condensation heating chamber in a lower portion thereof and a drying chamber in an upper portion thereof, the method comprising the steps of:

projecting a first portion of a transfer member, located within the drying chamber, through an upper access means in the heating facility;

attaching the article to said first portion;

moving the first portion of the transfer member to transfer the article thereon through the drying chamber and into the condensation heating chamber through a lower access means in the bottom of said drying chamber;

sealably closing the upper access means as the article is being moved through the drying chamber;

moving the transfer member to raise the articles into the drying chamber after the condensation heating operation is complete;

closing said lower access means to seal the drying chamber with the article therein;

activating drying means connected to the drying chamber to remove vapors therein;

opening the upper access means upon removal of the vapors from the drying chamber;

moving the transfer member to project the first portion thereof through the upper access means; and removing the article from the first portion of the transfer member.

2. A method for transferring an article into and through a heating facility having a condensation heating chamber in a lower portion thereof and a drying chamber in an upper portion thereof, the method comprising the steps of:

attaching the article to a first end of a transfer member projecting through an upper access means in the drying chamber; and pivoting the transfer member about a second end thereof to arcuately lower the article through the drying chamber and into the condensation heating chamber through a lower access means in a divider means separating the drying chamber and the condensation heating chamber.

3. The method as set forth in claim 2, comprising the further steps of:

sealably closing the upper access means as the article is being moved into the condensation heating chamber;

pivoting the transfer member to arcuately raise the articles into the drying chamber after the condensation heating operation is complete;

closing said lower access means to seal the drying chamber with the article therein;

activating drying means connected to the drying chamber to remove vapors therein;

opening the upper access means upon removal of the vapors in the drying chamber;

pivoting the transfer member to project the first end thereof through the upper access means; and removing the articles from the first end of the transfer member.

4. The method as set forth in claim 2, wherein: the facility is a condensation soldering facility wherein the article is soldered in the heating chamber.

5. A condensation heating facility, comprising:

a housing having a drying chamber in the upper portion thereof and a condensation heating chamber in the lower portion thereof;

a divider means, having a first access means therein, separating the drying chamber from the condensation heating chamber;

a second access means located in the drying chamber; and a transfer member, having one end pivotably mounted within the drying chamber, to accept articles on a portion thereof which is projected through the second access means to arcuately transfer said articles through the drying chamber and into the condensation heating chamber via said first access means.

6. The condensation heating facility as set forth in claim 5, wherein:

the facility is a condensation soldering facility wherein the article is soldered in the heating chamber.

7. The facility as set forth in claim 5, wherein:

the first and second access means are arcuately shaped, sealable, doors mounted for rotatable movement.

8. A kit having component parts which are capable of being assembled to provide a drying chamber above a condensation heating chamber of a condensation soldering facility, said kit comprising:

a housing having a top, bottom and sidewalls;

sealable, arcuately shaped doors located in the top and bottom of the housing;

a drying system connectable to the housing for removing vapor therefrom; and a transfer member which is pivotably mountable at a first end thereof within the chamber and adapted to receive articles through the top door on a second end of the transfer member which projects therethrough, to arcuately transfer said articles through the chamber and out the bottom door to the condensation heating chamber and vice versa.

* * * * *